US011675722B2

(12) United States Patent
Kolor et al.

(10) Patent No.: US 11,675,722 B2
(45) Date of Patent: Jun. 13, 2023

(54) MULTIPLE INDEPENDENT ON-CHIP INTERCONNECT

(71) Applicant: Apple Inc., Cupertino, CA (US)

(72) Inventors: Sergio Kolor, Haifa (IL); Sergio V. Tota, London (GB); Tzach Zemer, Haifa (IL); Sagi Lahav, Haifa (IL); Jonathan M. Redshaw, St. Albans (GB); Per H. Hammarlund, Sunnyvale, CA (US); Eran Tamari, Herzeliya Pituach (IL); James Vash, San Ramon, CA (US); Gaurav Garg, Santa Clara, CA (US); Lior Zimet, Kerem Maharal (IL); Harshavardhan Kaushikkar, Santa Clara, CA (US); Steven Fishwick, St Albans (GB); Steven R. Hutsell, San Jose, CA (US); Shawn M. Fukami, Newark, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/337,805

(22) Filed: Jun. 3, 2021

(65) Prior Publication Data

US 2022/0334997 A1    Oct. 20, 2022

Related U.S. Application Data

(60) Provisional application No. 63/176,075, filed on Apr. 16, 2021.

(51) Int. Cl.
*G06F 13/40* (2006.01)
*G06F 15/173* (2006.01)

(52) U.S. Cl.
CPC ...... *G06F 13/4027* (2013.01); *G06F 13/4022* (2013.01); *G06F 15/17375* (2013.01); *G06F 15/17381* (2013.01)

(58) Field of Classification Search
CPC ............. G06F 13/4027; G06F 13/4022; G06F 15/17375; G06F 15/17381
See application file for complete search history.

(56) References Cited

U.S. PATENT DOCUMENTS

| | | | |
|---|---|---|---|
| 7,340,548 B2 * | 3/2008 | Love | .................... G06F 13/4081 |
| | | | 710/308 |
| 8,190,855 B1 | 5/2012 | Ramey et al. | |
| | (Continued) | | |

FOREIGN PATENT DOCUMENTS

| | | |
|---|---|---|
| WO | 2014185917 A1 | 11/2014 |
| WO | 2017112198 A1 | 6/2017 |

OTHER PUBLICATIONS

U.S. Appl. No. 17/868,495, filed Jul. 20, 2022.
(Continued)

*Primary Examiner* — Faisal M Zaman
(74) *Attorney, Agent, or Firm* — Kowert, Hood, Munyon, Rankin & Goetzel, P.C.

(57) ABSTRACT

In an embodiment, a system on a chip (SOC) comprises a semiconductor die on which circuitry is formed, wherein the circuitry comprises a plurality of agents and a plurality of network switches coupled to the plurality of agents. The plurality of network switches are interconnected to form a plurality of physical and logically independent networks. A first network of the plurality of physically and logically independent networks is constructed according to a first topology and a second network of the plurality of physically and logically independent networks is constructed according to a second topology that is different from the first topology. For example, the first topology may a ring topology and the second topology may be a mesh topology. In an embodiment, coherency may be enforced on the first network and the second network may be a relaxed order network.

22 Claims, 12 Drawing Sheets

(56) References Cited

U.S. PATENT DOCUMENTS

| | | | |
|---|---|---|---|
| 9,244,874 B2 | 1/2016 | Hearn et al. | |
| 10,523,585 B2 | 12/2019 | Davis et al. | |
| 10,673,439 B1* | 6/2020 | Ahmad | H03K 19/17728 |
| 10,733,350 B1* | 8/2020 | Prasad | G06F 30/33 |
| 11,016,810 B1* | 5/2021 | Parikh | G06N 3/063 |
| 2005/0138260 A1* | 6/2005 | Love | G06F 13/4081 |
| | | | 710/306 |
| 2005/0195835 A1* | 9/2005 | Savage | H04L 45/02 |
| | | | 370/401 |
| 2014/0201500 A1 | 7/2014 | Niell et al. | |
| 2014/0301241 A1* | 10/2014 | Kumar | H04L 41/12 |
| | | | 370/254 |
| 2015/0036536 A1* | 2/2015 | Kumar | H04L 41/0826 |
| | | | 370/254 |
| 2015/0341224 A1* | 11/2015 | van Ruymbeke | G06F 30/18 |
| | | | 370/254 |
| 2016/0378701 A1* | 12/2016 | Niell | G06F 12/0831 |
| | | | 710/308 |
| 2017/0220499 A1 | 8/2017 | Gray | |
| 2018/0218105 A1* | 8/2018 | de Lescure | G06F 30/394 |
| 2018/0285290 A1* | 10/2018 | Luan | G06F 13/4022 |
| 2019/0205493 A1* | 7/2019 | Garibay | G06F 30/394 |
| 2019/0340314 A1 | 11/2019 | Boesch et al. | |
| 2019/0361770 A1 | 11/2019 | Geng et al. | |
| 2019/0378238 A1 | 12/2019 | Ramadoss et al. | |
| 2020/0074713 A1 | 3/2020 | Schluessler et al. | |
| 2020/0151005 A1 | 5/2020 | Park et al. | |
| 2020/0153757 A1* | 5/2020 | Bharadwaj | H04L 45/58 |

OTHER PUBLICATIONS

Hansson et al., "An On-Chip Interconnect and Protocol Stack for Multiple Communication Paradigms and Programming Models", Harware/Software Codesign and System Synthesis Conference, Grenoble, France, Oct. 11-16, 2009, 10 pages.

Combined Search and Examination Report from GB patent application GB2205129.6, dated Nov. 30, 2022, 9 pages.

* cited by examiner

| Virtual Channel | Networks |
|---|---|
| Bulk | CPU, I/O, Relaxed |
| LLT | CPU, I/O, Relaxed |
| RT | I/O |
| VCP | I/O |

80

| Type | Networks |
|---|---|
| Coherent | CPU, I/O |
| Non-coherent | Relaxed |
| RT | I/O |
| VCP | I/O |

82

MULTIPLE INDEPENDENT ON-CHIP INTERCONNECT

This application claims benefit of priority to U.S. Provisional Patent Application Ser. No. 63/176,075, filed on Apr. 16, 2021. The above application is incorporated herein by reference in its entirety. The extent that any incorporated material conflicts with the material expressly set forth herein, the material expressly set forth herein controls.

BACKGROUND

Technical Field

Embodiments described herein are related to system on a chip (SOC) integrated circuits and, more particularly, to interconnect between components in an SOC.

Description of the Related Art

System on a chip (SOC) integrated circuits (ICs) generally include one or more processors that serve as central processing units (CPUs) for a system, along with various other components such a memory controllers and peripheral components. Additional components can be included with the SOC to form a given device. However, as the number of transistors that can be achieved on in integrated circuit die has continued to increase, it has been possible to incorporate increased numbers of processors and other components on a given SOC and thus reduce the number of other components needed to form the given device.

Increasing the numbers of processors and other discrete components on an SOC is desirable for increased performance. Additionally, cost savings can be achieved in a device by reducing the number of other components needed to form the device in addition to the SOC. The device may be more compact (smaller in size) if more of the overall system is incorporated into the SOC. Reduced power consumption for the device as a whole can be achieved by incorporating more components into the SOC.

On the other hand, increasing the numbers of processors and other components on the SOC increases the bandwidth requirements between the memory controllers and the components, and can overwhelm the interconnect used to communicate on the SOC which can lead to latency increases. The lack of available bandwidth and increase in latency can reduce the performance benefits that were expected to be achieved by incorporating the components into the SOC.

BRIEF DESCRIPTION OF THE DRAWINGS

The following detailed description refers to the accompanying drawings, which are now briefly described.

Figure 1:
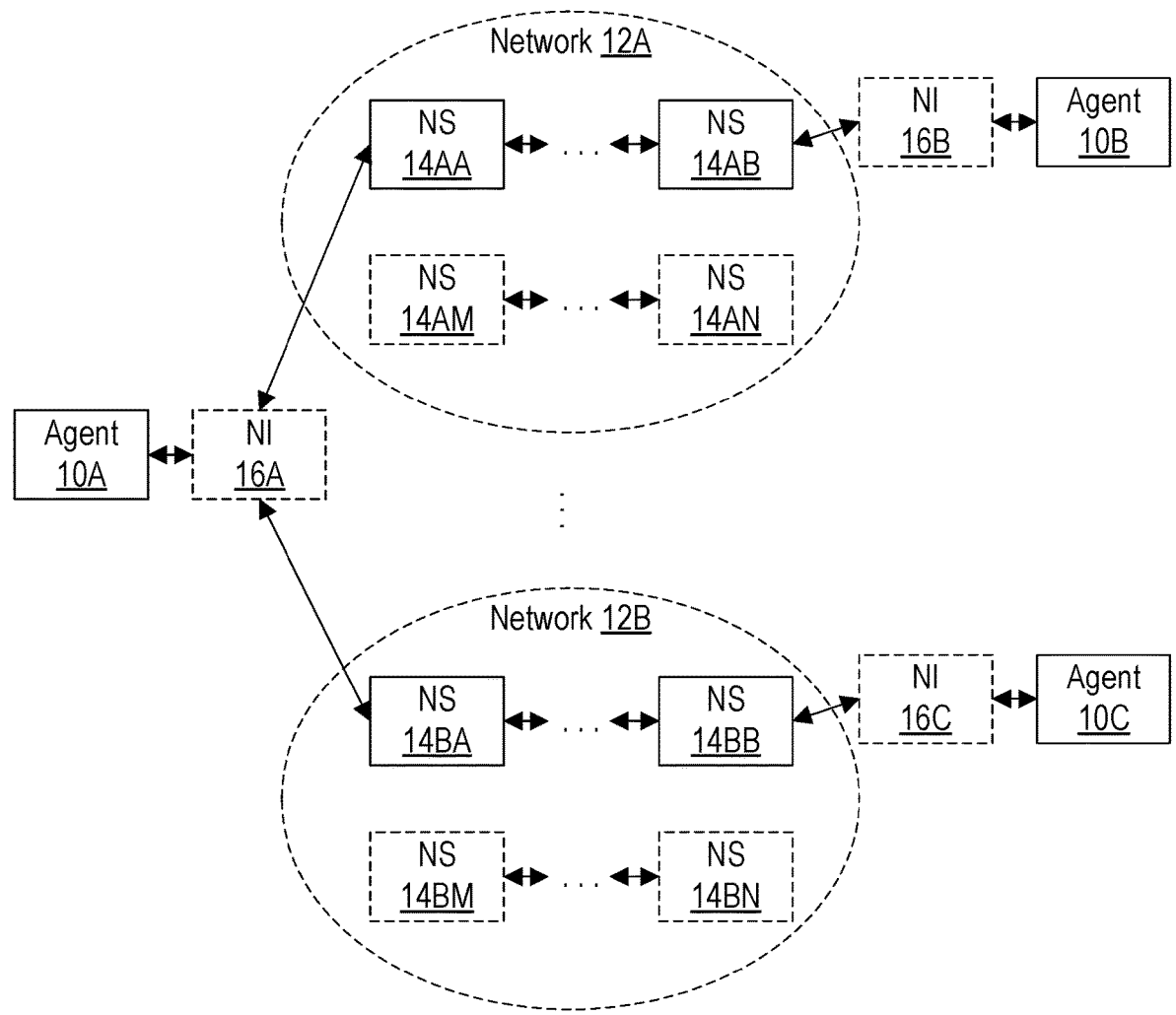
FIG. 1 is a block diagram of a system including one embodiment of multiple networks interconnecting agents.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

In an embodiment, a system on a chip (SOC) may include a plurality of independent networks. The networks may be physically independent (e.g., having dedicated wires and other circuitry that form the network) and logically independent (e.g., communications sourced by agents in the SOC may be logically defined to be transmitted on a selected network of the plurality of networks and may not be impacted by transmission on other networks). In some embodiments, network switches may be included to transmit packets on a given network. The network switches may be physically part of the network (e.g., there may be dedicated network switches for each network). In other embodiments, a network switch may be shared between physically independent networks and thus may ensure that a communication received on one of the networks remains on that network.

By providing physically and logically independent networks, high bandwidth may be achieved via parallel communication on the different networks. Additionally, different traffic may be transmitted on different networks, and thus a given network may be optimized for a given type of traffic. For example, processors such as central processing units (CPUs) in an SOC may be sensitive to memory latency and may cache data that is expected to be coherent among the processors and memory. Accordingly, a CPU network may be provided on which the CPUs and the memory controllers in a system are agents. The CPU network may be optimized to provide low latency. For example, there may be virtual channels for low latency requests and bulk requests, in an embodiment. The low latency requests may be favored over the bulk requests in forwarding around the fabric and by the memory controllers. The CPU network may also support cache coherency with messages and protocol defined to communicate coherently. Another network may be an input/output (I/O) network. This network may be used by various peripheral devices ("peripherals") to communicate with memory. The network may support the bandwidth needed by the peripherals and may also support cache coherency. However, I/O traffic may sometimes have significantly higher latency than CPU traffic. By separating the I/O traffic from the CPU to memory traffic, the CPU traffic may be less affected by the I/O traffic. The CPUs may be included as agents on the I/O network as well to manage coherency and to communicate with the peripherals. Yet another network, in an embodiment, may be a relaxed order network. The CPU and I/O networks may both support ordering models among the communications on those networks that provide the ordering expected by the CPUs and peripherals. However, the relaxed order network may be non-coherent and may not enforce as many ordering constraints. The relaxed order network may be used by graphics processing units (GPUs) to communicate with memory controllers. Thus, the GPUs may have dedicated bandwidth in the networks and may not be constrained by the ordering required by the CPUs and/or peripherals. Other embodiments may employ any subset of the above networks and/or any additional networks, as desired.

A network switch may be a circuit that is configured to receive communications on a network and forward the communications on the network in the direction of the destination of the communication. For example, a communication sourced by a processor may be transmitted to a memory controller that controls the memory that is mapped to the address of the communication. At each network switch, the communication may be transmitted forward toward the memory controller. If the communication is a read, the memory controller may communicate the data back to the source and each network switch may forward the data on the network toward the source. In an embodiment, the network may support a plurality of virtual channels. The network switch may employ resources dedicated to each virtual channel (e.g., buffers) so that communications on the virtual channels may remain logically independent. The network switch may also employ arbitration circuitry to select among buffered communications to forward on the network. Virtual channels may be channels that physically share a network but which are logically independent on the network (e.g., communications in one virtual channel do not block progress of communications on another virtual channel).

An agent may generally be any device (e.g., processor, peripheral, memory controller, etc.) that may source and/or sink communications on a network. A source agent generates (sources) a communication, and a destination agent receives (sinks) the communication. A given agent may be a source agent for some communications and a destination agent for other communications.

Figure 2:
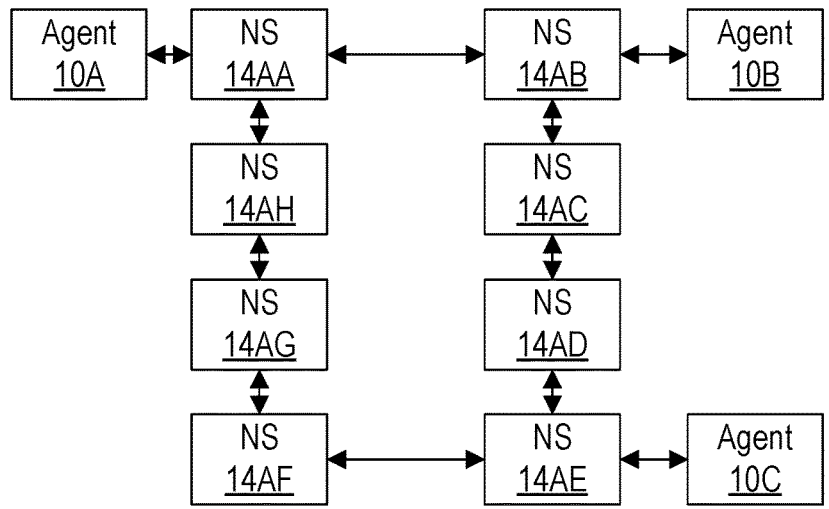
FIG. 2 is a block diagram of one embodiment of a network using a ring topology.
Figure 3:
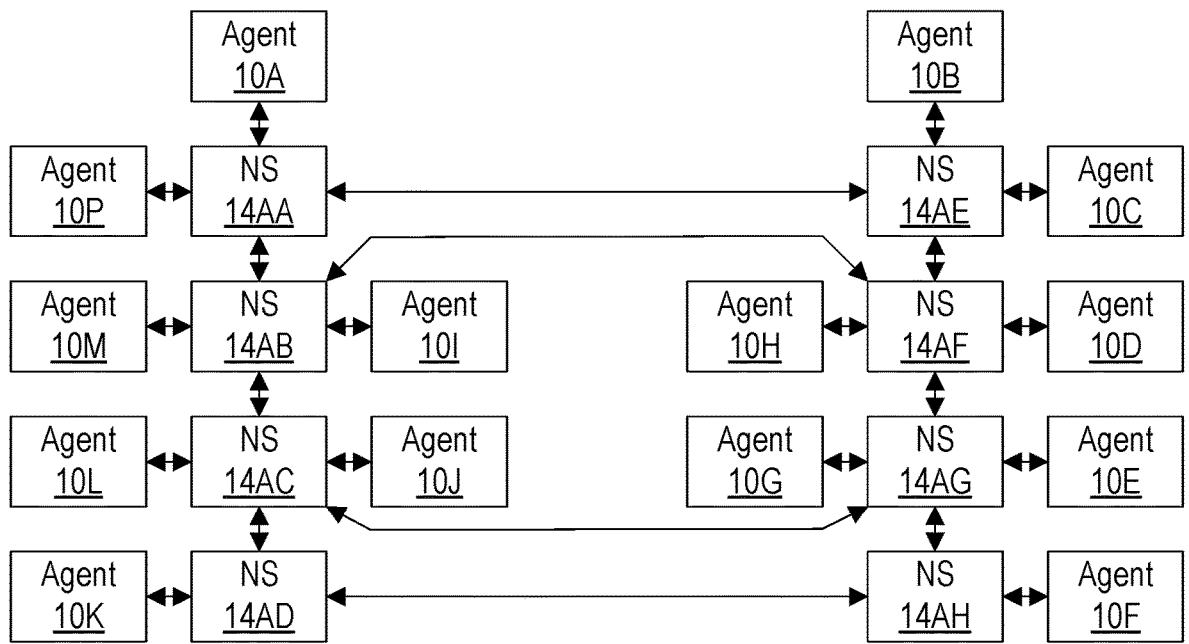
FIG. 3 is a block diagram of one embodiment of a network using a mesh topology.
Figure 4:
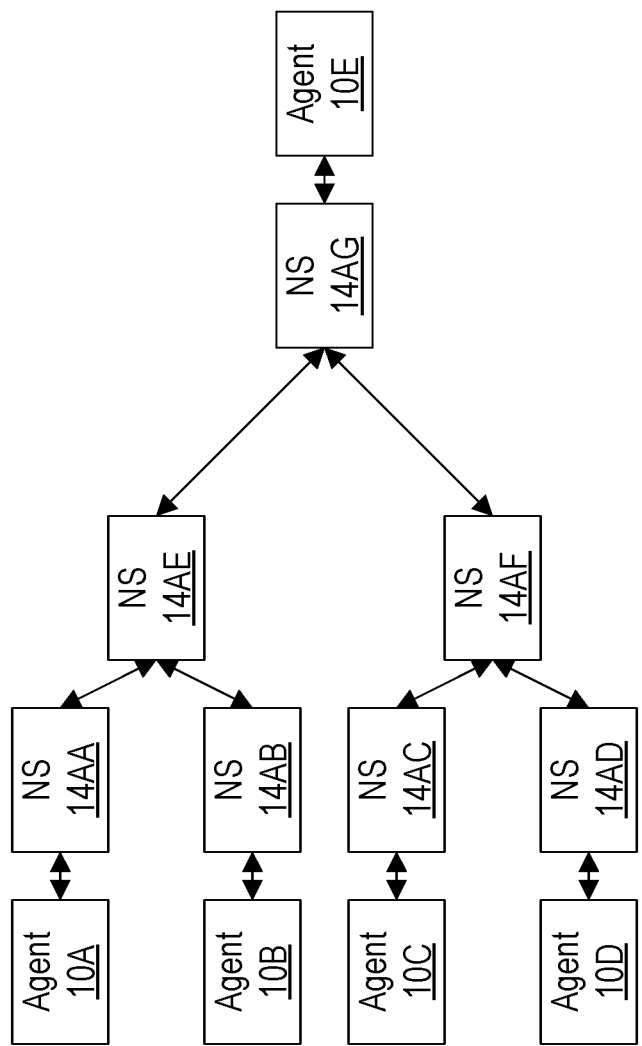
FIG. 4 is a block diagram of one embodiment of a network using a tree topology.
Figure 5:
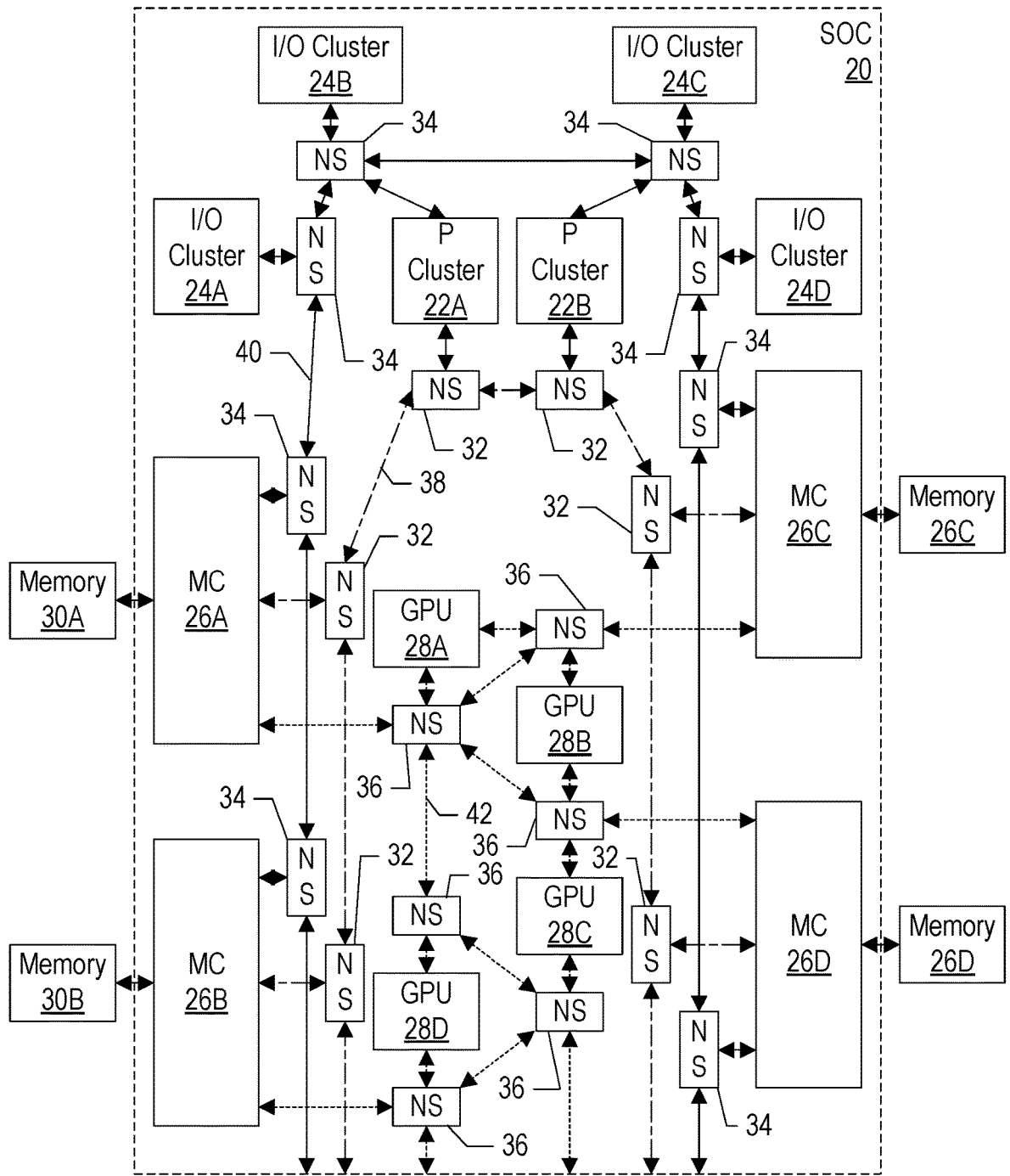
FIG. 5 is a block diagram of one embodiment of a system on a chip (SOC) having multiple networks for one embodiment.
Figure 6:
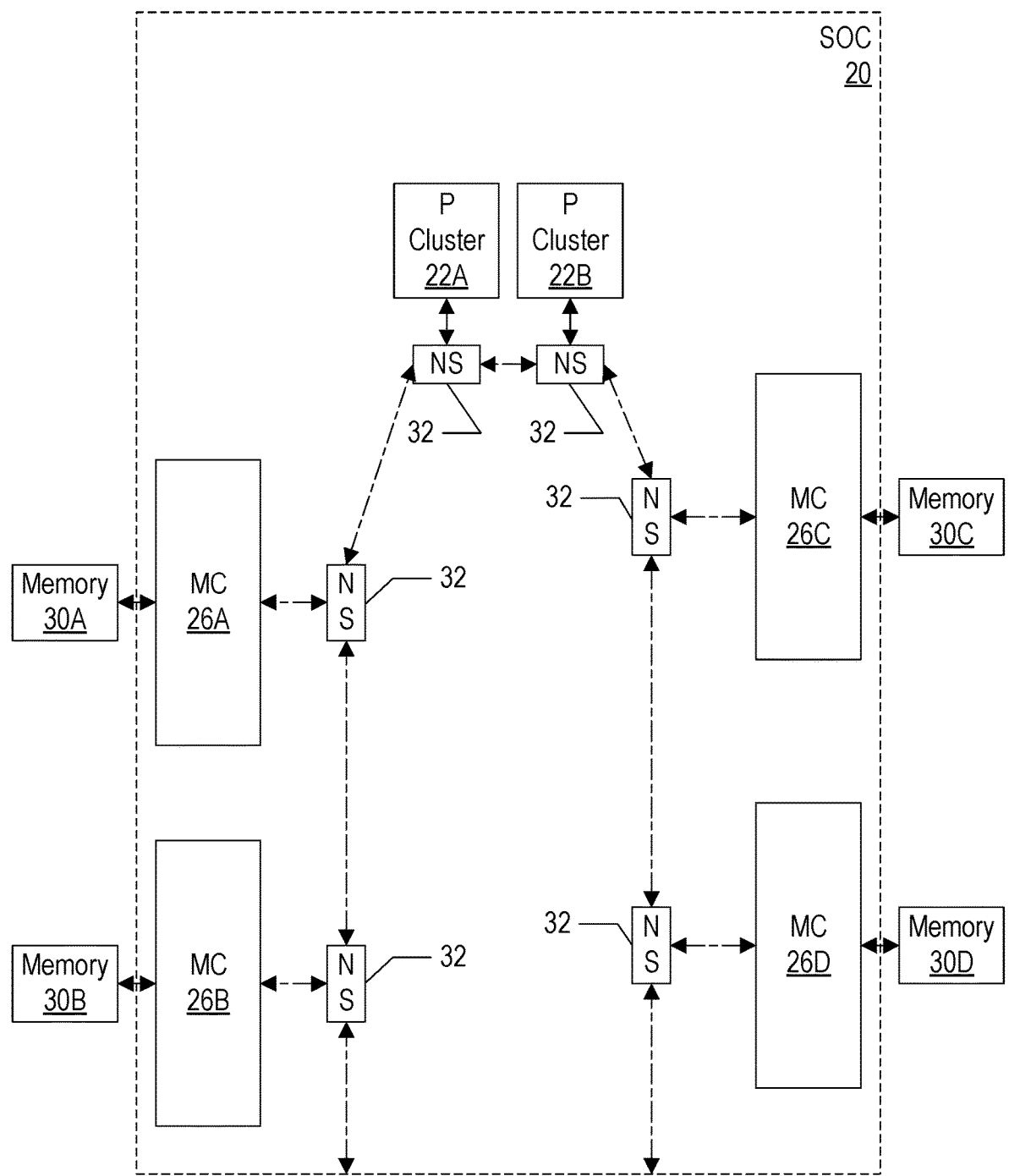
FIG. 6 is a block diagram of one embodiment of a system on a chip (SOC) illustrating one of the independent networks shown in FIG. 5 for one embodiment.
Figure 7:
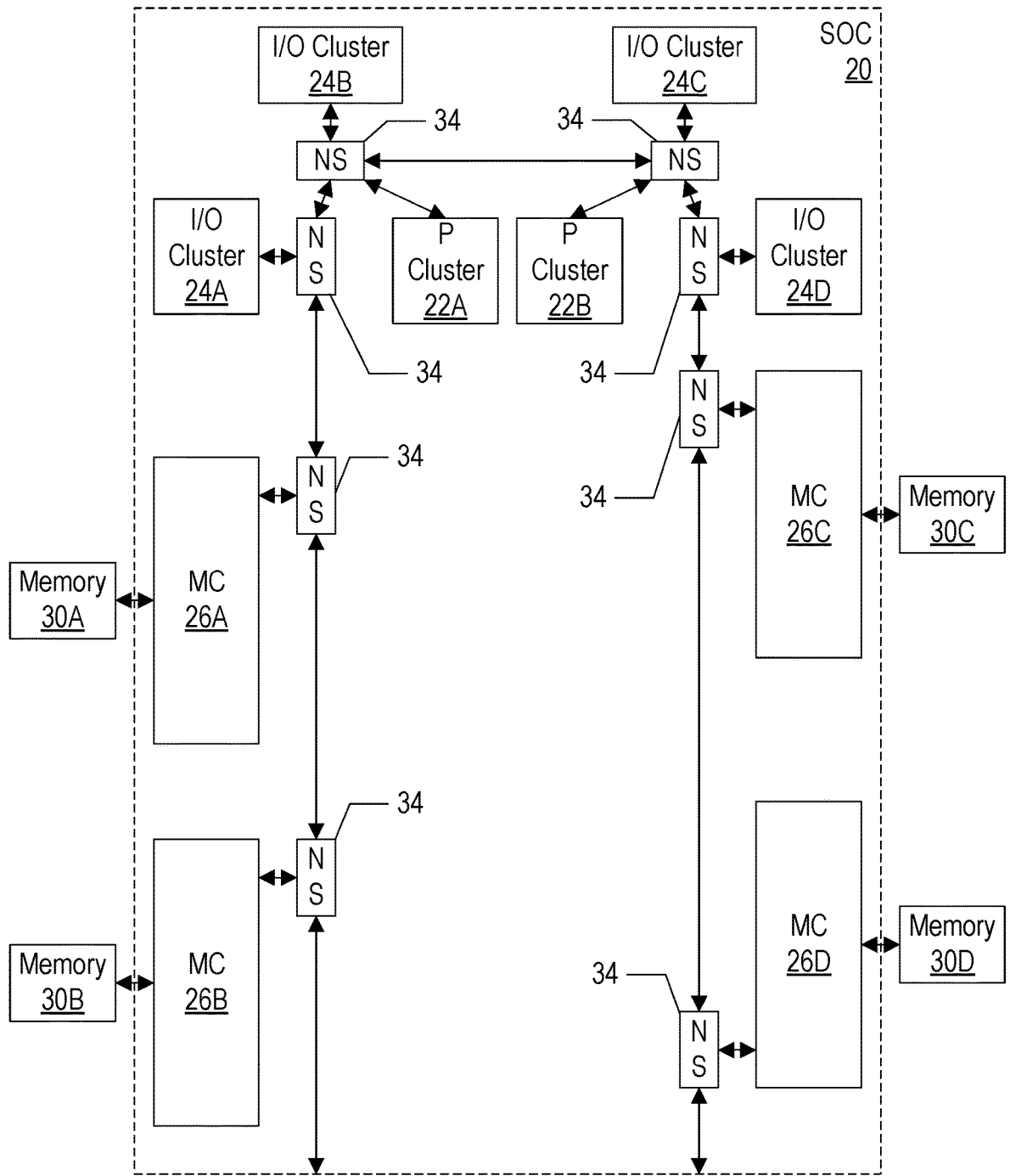
FIG. 7 is a block diagram of one embodiment of a system on a chip (SOC) illustrating another one of the independent networks shown in FIG. 5 for one embodiment.
Figure 8:
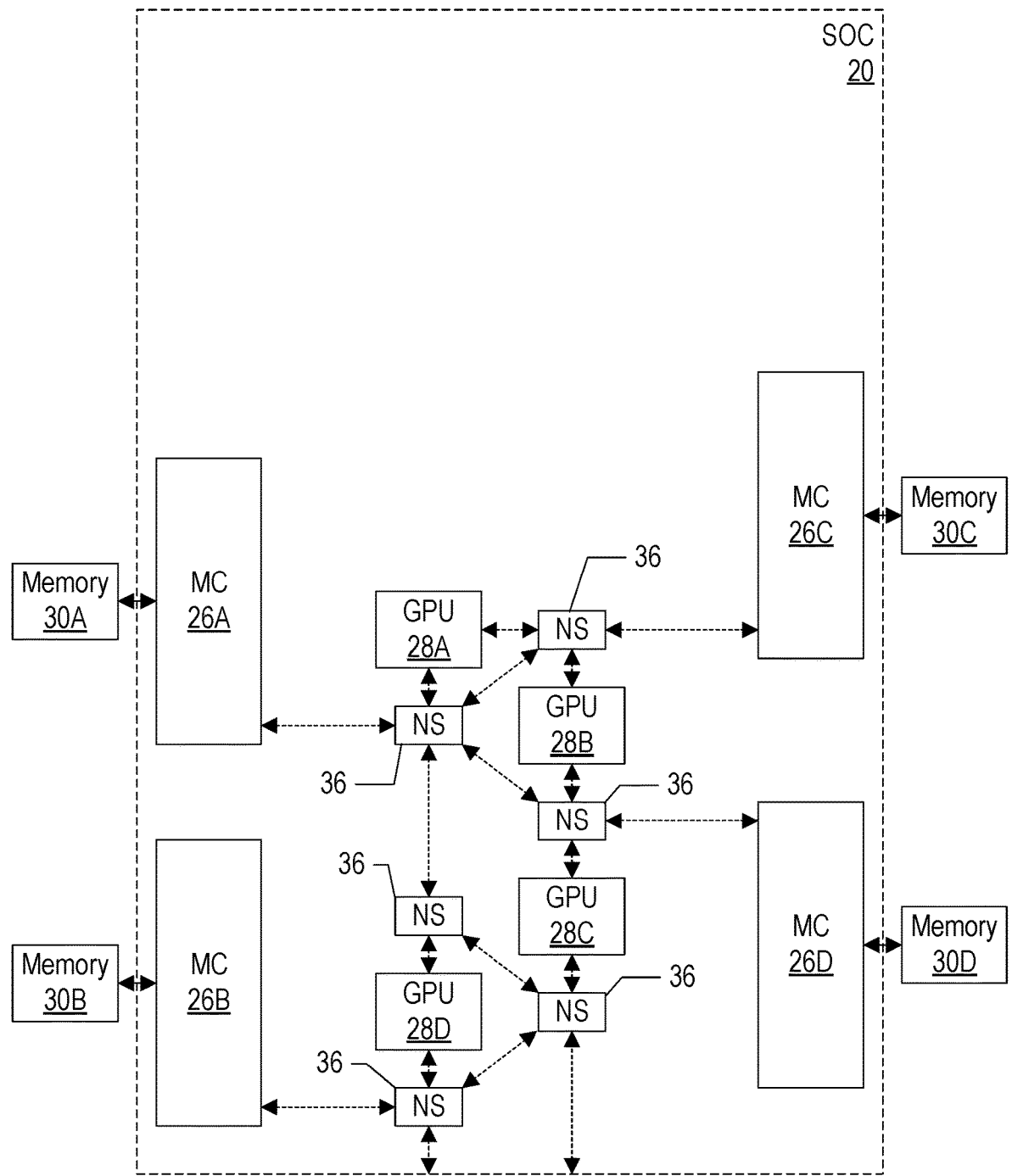
FIG. 8 is a block diagram of one embodiment of a system on a chip (SOC) illustrating yet another one of the independent networks shown in FIG. 5 for one embodiment.
Figure 9:
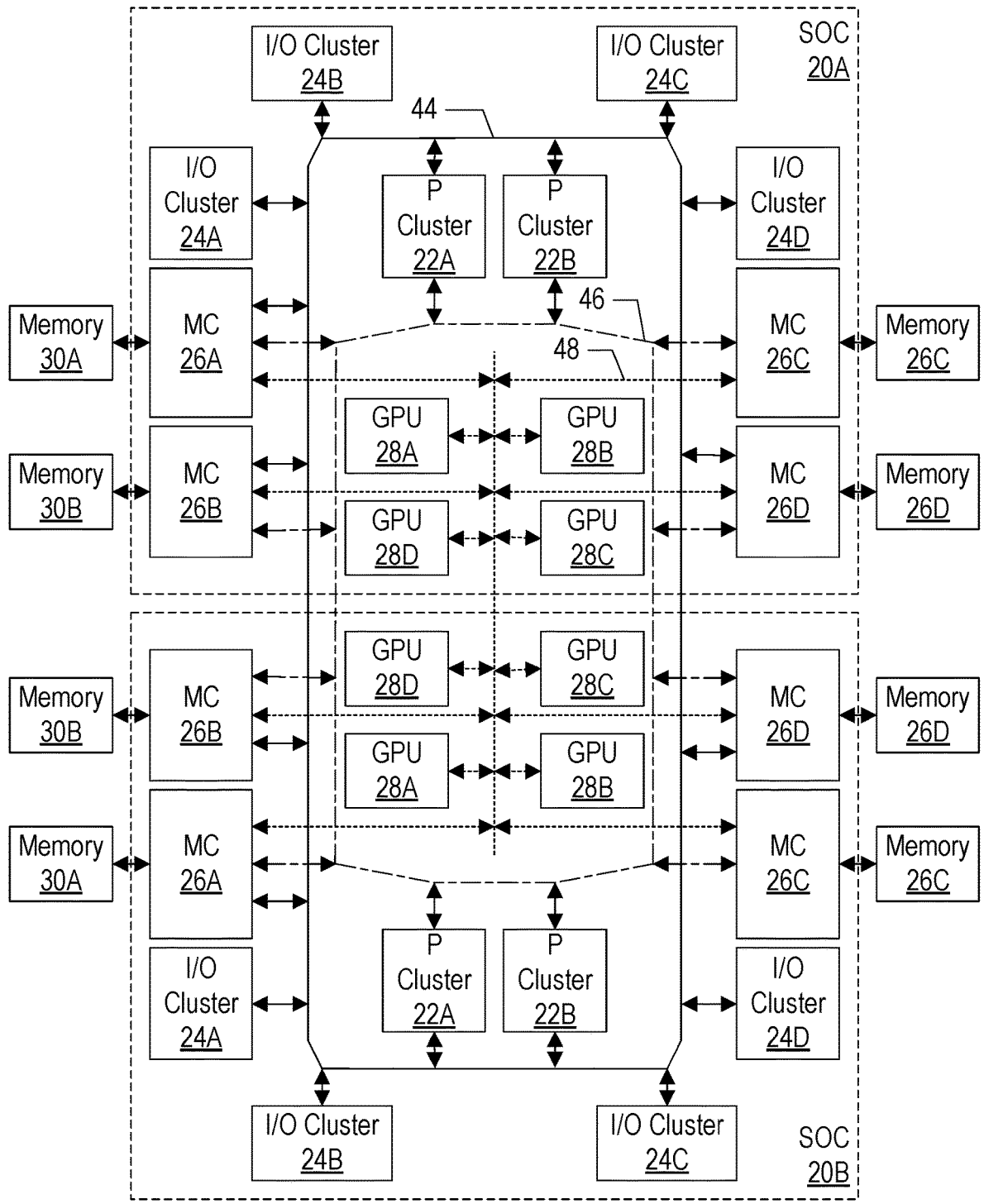
FIG. 9 is a block diagram of one embodiment of a multi-die system including two semiconductor die.
Figure 10:
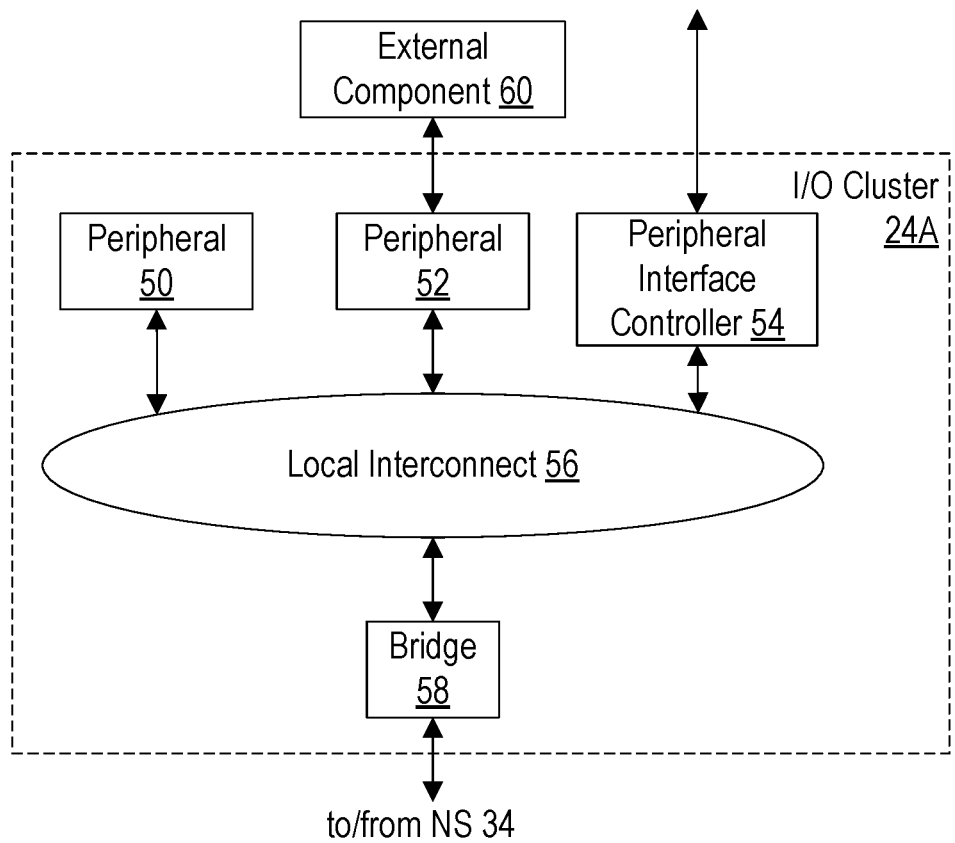
FIG. 10 is a block diagram of one embodiment of an input/output (I/O) cluster.
Figure 11:
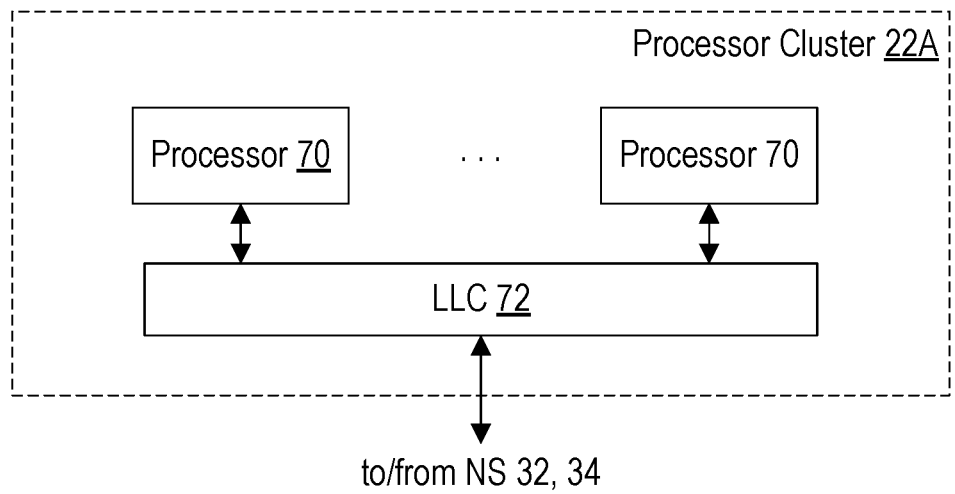
FIG. 11 is a block diagram of one embodiment of a processor cluster.
Figures 12, 13:
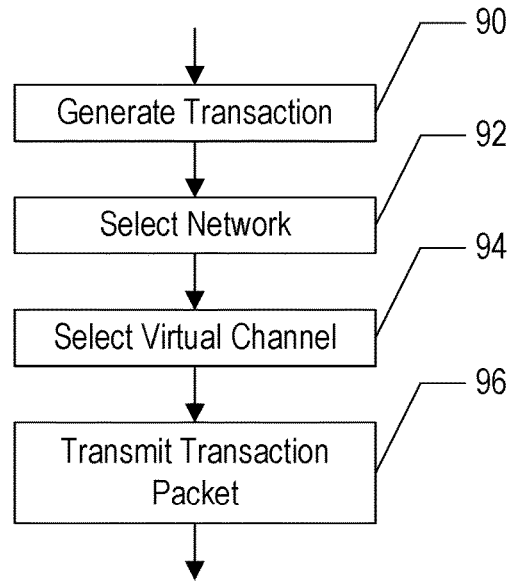
FIG. 12 is a pair of tables illustrating virtual channels and traffic types and networks shown in FIGS. 5 to 8 in which they are used for one embodiment.
FIG. 13 is a flowchart illustrating one embodiment of initiating a transaction on a network.
Figure 14:
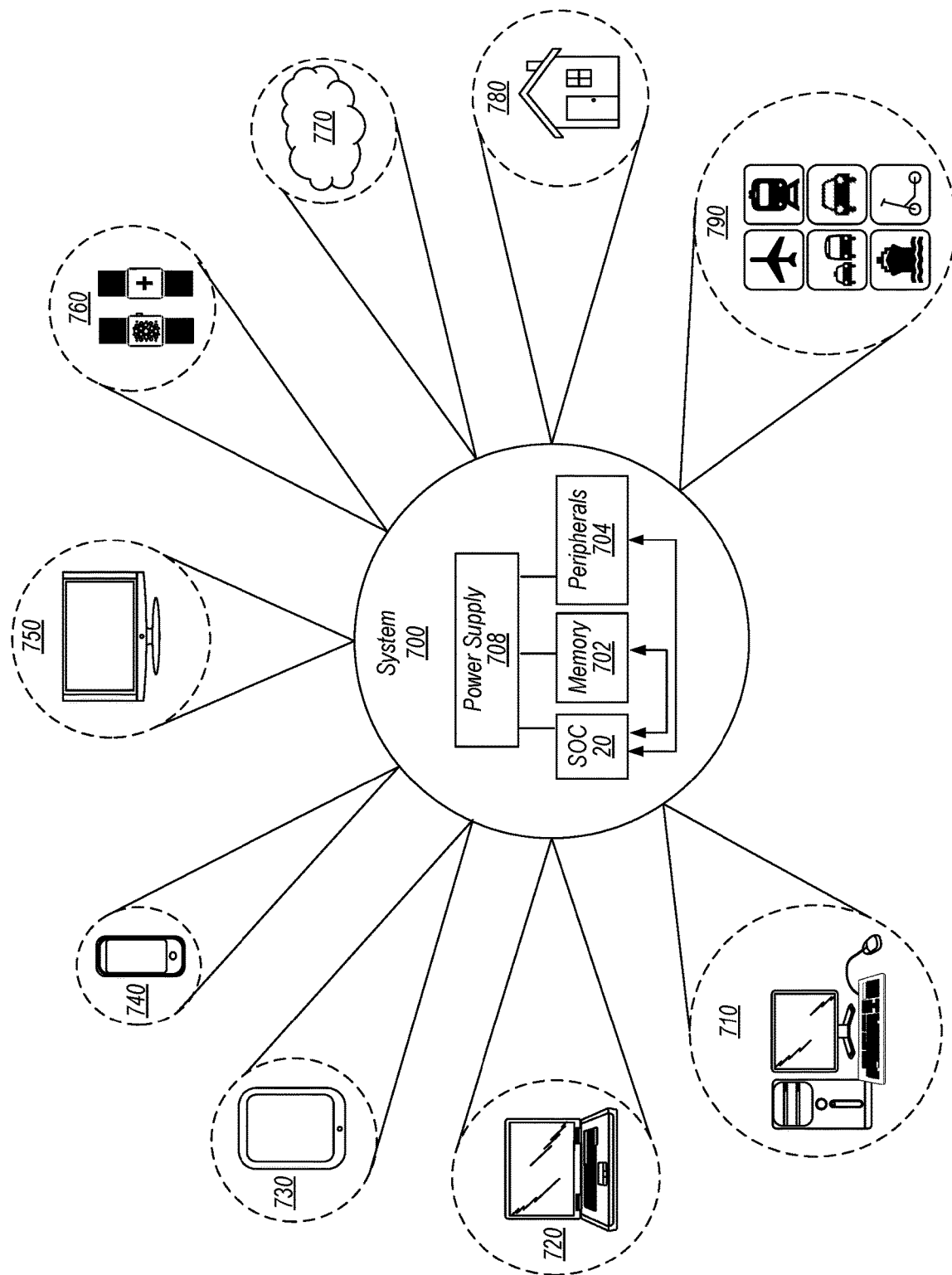
FIG. 14 is a block diagram one embodiment of a system.
Figure 15:
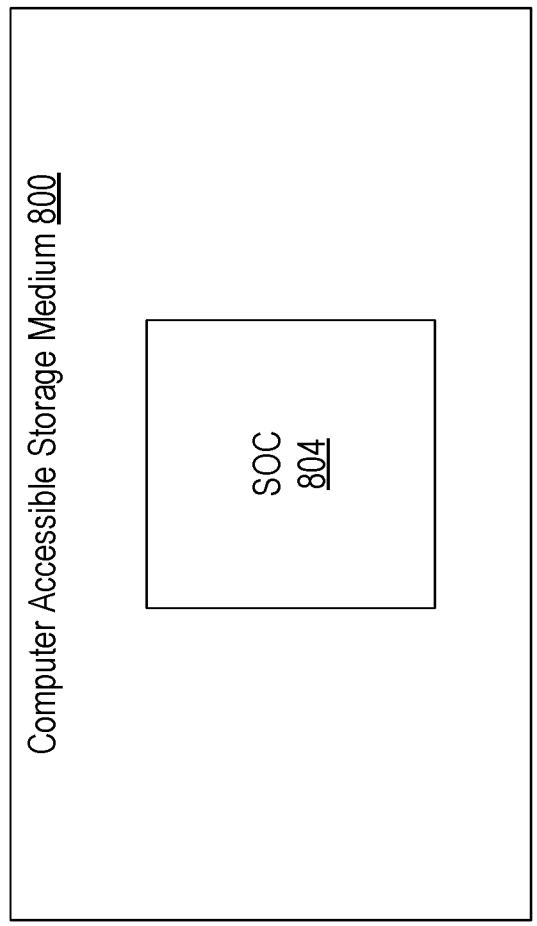
FIG. 15 is a block diagram of one embodiment of a computer accessible storage medium.

Turning now to the figures, FIG. 1 is a generic diagram illustrating physically and logically independent networks. FIGS. 2-4 are examples of various network topologies. FIG. 5 is an example of an SOC with a plurality of physically and logically independent networks. FIGS. 6-8 illustrate the various networks of FIG. 5 separately for additional clarity. FIG. 9 is a block diagram of a system including two semiconductor die, illustrating scalability of the networks to multiple instances of the SOC. FIGS. 10 and 11 are example agents shown in greater detail. FIG. 12 shows various virtual channels and communication types and which networks in FIG. 5 to which the virtual channels and communication types apply. FIG. 13 is a flowchart illustrating a method, and FIGS. 14 and 15 are example system and computer accessible storage medium embodiments. The description below will provide further details based on the drawings.

FIG. 1 is a block diagram of a system including one embodiment of multiple networks interconnecting agents. In FIG. 1, agents 10A, 10B, and 10C are illustrated, although any number of agents may be included in various embodiments. The agents 10A-10B are coupled to a network 12A and the agents 10A and 10C are coupled to a network 12B. Any number of networks 12A-12B may be included in various embodiments as well. The network 12A includes a plurality of network switches including network switches 14AA, 14AB, 14AM, and 14AN (collectively network switches 14A); and, similarly, the network 12B includes a plurality of network switches including network switches 14BA, 14BB, 14BM, and 14BN (collectively network switches 14B). Different networks 12A-12B may include different numbers of network switches 14A-14B. Additionally, the networks 12A-12B include physically separate connections ("wires," "busses," or "interconnect"), illustrated as various arrows in FIG. 1.

Since each network 12A-12B has its own physically and logically separate interconnect and network switches, the networks 12A-12B are physically and logically separate. A communication on network 12A is unaffected by a communication on network 12B, and vice versa. Even the bandwidth on the interconnect in the respective networks 12A-12B is separate and independent.

Optionally, an agent 10A-10C may include or may be coupled to a network interface circuit (reference numerals 16A-16C, respectively). Some agents 10A-10C may include or may be coupled to network interfaces 16A-16C while other agents 10A-10C may not including or may not be coupled to network interfaces 16A-16C. The network interfaces 16A-16C may be configured to transmit and receive traffic on the networks 12A-12B on behalf of the corresponding agents 10A-10C. The network interfaces 16A-16C may be configured to convert or modify communications issued by the corresponding agents 10A-10C to conform to the protocol/format of the networks 12A-12B, and to remove modifications or convert received communications to the protocol/format used by the agents 10A-10C. Thus, the network interfaces 16A-16C may be used for agents 10A-10C that are not specifically designed to interface to the networks 12A-12B directly. In some cases, an agent 10A-10C may communicate on more than one network (e.g., agent 10A communicates on both networks 12A-12B in FIG. 1). The corresponding network interface 16A may be configured to separate traffic issued by the agent 10A to the networks 12A-12B according to which network 12A-12B each communication is assigned; and the network interface 16A may be configured to combine traffic received from the networks 12A-12B for the corresponding agent 10A. Any mechanism for determining with network 12A-12B is to carry a given communication may be used (e.g., based on the type of communication, the destination agent 10B-10C for the communication, address, etc. in various embodiments).

Since the network interface circuits are optional and many not be needed for agents the support the networks 12A-12B directly, the network interface circuits will be omitted from the remainder of the drawings for simplicity. However, it is understood that the network interface circuits may be employed in any of the illustrated embodiments by any agent or subset of agents, or even all of the agents.

In an embodiment, the system of FIG. 1 may be implemented as an SOC and the components illustrated in FIG. 1 may be formed on a single semiconductor substrate die. The circuitry included in the SOC may include the plurality of agents 10A-10C and the plurality of network switches 14A-14B coupled to the plurality of agents 10A-10C. The plurality of network switches 14A-14B are interconnected to form a plurality of physical and logically independent networks 12A-12B.

Since networks 12A-12B are physically and logically independent, different networks may have different topologies. For example, a given network may have a ring, mesh, a tree, a star, a fully connected set of network switches (e.g., switch connected to each other switch in the network directly), a shared bus with multiple agents coupled to the bus, etc. or hybrids of any one or more of the topologies. Each network 12A-12B may employ a topology that provides the bandwidth and latency attributes desired for that network, for example, or provides any desired attribute for the network. Thus, generally, the SOC may include a first network constructed according to a first topology and a second network constructed according to a second topology that is different from the first topology.

FIGS. 2-4 illustrate example topologies. FIG. 2 is a block diagram of one embodiment of a network using a ring topology to couple agents 10A-10C. In the example of FIG. 2, the ring is formed from network switches 14AA-14AH. The agent 10A is coupled to the network switch 14AA; the agent 10B is coupled to the network switch 14AB; and the agent 10C is coupled to the network switch 14AE.

In a ring topology, each network switch 14AA-14AH may be connected to two other network switches 14AA-14AH, and the switches form a ring such that any network switch 14AA-14AH may reach any other network switch in the ring by transmitting a communication on the ring in the direction of the other network switch. A given communication may pass through one or more intermediate network switches in the ring to reach the targeted network switch. When a given network switch 14AA-14AH receives a communication from an adjacent network switch 14AA-14AH on the ring, the given network switch may examine the communication to determine in an agent 10A-10C to which the given network switch is coupled is the destination of the communication. If so, the given network switch may terminate the communication and forward the communication to the agent. If not, the given network switch may forward the communication to the next network switch on the ring (e.g., the other network switch 14AA-14AH that is adjacent to the given network switch and is not the adjacent network switch from which the given network switch received the communication). An adjacent network switch to a given network switch may be network switch to when the given network switch may directly transmit a communication, without the communication traveling through any intermediate network switches.

FIG. 3 is a block diagram of one embodiment of a network using a mesh topology to couple agents 10A-10P. As shown in FIG. 3, the network may include network switches 14AA-14AH. Each network switch 14AA-14AH is coupled to two or more other network switches. For example, network switch 14AA is coupled to network switches 14AB and 14AE; network switch 14AB is coupled to network switches 14AA, 14AF, and 14AC; etc. as illustrated in FIG. 3. Thus, different network switches in a mesh network may be coupled to different numbers of other network switches. Furthermore, while the embodiment of FIG. 3 has a relatively symmetrical structure, other mesh networks may be asymmetrical dependent, e.g., on the various traffic patterns that are expected to be prevalent on the network. At each network switch 14AA-14AH, one or more attributes of a received communication may be used to determine the adjacent network switch 14AA-14AH to which the receiving network switch 14AA-14AH will transmit the communication (unless an agent 10A-10P to which the receiving network switch 14AA-14AH is coupled is the destination of the communication, in which case the receiving network switch 14AA-14AH may terminate the communication on the network and provide it to the destination agent 10A-10P). For example, in an embodiment, the network switches 14AA-14AH may be programmed at system initialization to route communications based on various attributes.

In an embodiment, communications may be routed based on the destination agent. The routings may be configured to transport the communications through the fewest number of network switches (the "shortest path") between the source and destination agent that may be supported in the mesh topology. Alternatively, different communications for a given source agent to a given destination agent may take different paths through the mesh. For example, latency-sensitive communications may be transmitted over a shorter path while less critical communications may take a different path to avoid consuming bandwidth on the short path, where the different path may be less heavily loaded during use, for example.

FIG. 3 may be an example of a partially-connected mesh: at least some communications may pass through one or more intermediate network switches in the mesh. A fully-connected mesh may have a connection from each network switch to each other network switch, and thus any communication may be transmitted without traversing any intermediate network switches. Any level of interconnectedness may be used in various embodiments.

FIG. 4 is a block diagram of one embodiment of a network using a tree topology to couple agents 10A-10E. The network switches 14AA-14AG are interconnected to form the tree in this example. The tree is a form of hierarchical network in which there are edge network switches (e.g., 14AA, 14AB, 14AC, 14AD, and 14AG in FIG. 4) that couple to agents 10A-10E and intermediate network switches (e.g., 14AE and 14AF in FIG. 4) that couple only to other network switches. A tree network may be used, e.g., when a particular agent is often a destination for communications issued by other agents or is often a source agent for communications. Thus, for example, the tree network of FIG. 4 may be used for agent 10E being a principal source or destination for communications. For example, the agent 10E may be a memory controller which would frequently be a destination for memory transactions.

There are many other possible topologies that may be used in other embodiments. For example, a star topology has a source/destination agent in the "center" of a network and other agents may couple to the center agent directly or through a series of network switches. Like a tree topology, a star topology may be used in a case where the center agent is frequently a source or destination of communications. A shared bus topology may be used, and hybrids of two or more of any of the topologies may be used.

FIG. 5 is a block diagram of one embodiment of a system on a chip (SOC) 20 having multiple networks for one embodiment. In the embodiment of FIG. 5, the SOC 20 includes a plurality of processor clusters (P clusters) 22A-22B, a plurality of input/output (I/O) clusters 24A-24D, a plurality of memory controllers 26A-26D, and a plurality of graphics processing units (GPUs) 28A-28D. As implied by the name (SOC), the components illustrated in FIG. 5 (except for the memories 30A-30D in this embodiment) may be integrated onto a single semiconductor die or "chip." However, other embodiments may employ two or more die coupled or packaged in any desired fashion. Additionally, while specific numbers of P clusters 22A-22B, I/O clusters 24A-24D, memory controllers 26A-26D, and GPUs 28A-28D are shown in the example of FIG. 5, the number and arrangement of any of the above components may be varied and may be more or less than the number shown in FIG. 5. The memories 30A-30D are coupled to the SOC 20, and more specifically to the memory controllers 26A-26D respectively as shown in FIG. 5.

In the illustrated embodiment, the SOC 20 includes three physically and logically independent networks formed from a plurality of network switches 32, 34, and 36 as shown in FIG. 5 and interconnect therebetween, illustrated as arrows between the network switches and other components. Other embodiments may include more or fewer networks. The network switches 32, 34, and 36 may be instances of network switches similar to the network switches 14A-14B as described above with regard to FIGS. 1-4, for example. The plurality of network switches 32, 34, and 36 are coupled to the plurality of P clusters 22A-22B, the plurality of GPUs 28A-28D, the plurality of memory controllers 26A-25B, and the plurality of I/O clusters 24A-24D as shown in FIG. 5. The P clusters 22A-22B, the GPUs 28A-28B, the memory controllers 26A-26B, and the I/O clusters 24A-24D may all be examples of agents that communicate on the various networks of the SOC 20. Other agents may be included as desired.

In FIG. 5, a central processing unit (CPU) network is formed from a first subset of the plurality of network switches (e.g., network switches 32) and interconnect therebetween illustrated as short dash/long dash lines such as reference numeral 38. The CPU network couples the P clusters 22A-22B and the memory controllers 26A-26D. An I/O network is formed from a second subset of the plurality of network switches (e.g., network switches 34) and interconnect therebetween illustrated as solid lines such as reference numeral 40. The I/O network couples the P clusters 22A-22B, the I/O clusters 24A-24D, and the memory controllers 26A-26B. A relaxed order network is formed from a third subset of the plurality of network switches (e.g., network switches 36) and interconnect therebetween illustrated as short dash lines such as reference numeral 42. The relaxed order network couples the GPUs 28A-28D and the memory controllers 26A-26D. In an embodiment, the relaxed order network may also couple selected ones of the I/O clusters 24A-24D as well. As mentioned above, the CPU network, the I/O network, and the relaxed order network are independent of each other (e.g., logically and physically independent). In an embodiment, the protocol on the CPU network and the I/O network supports cache coherency (e.g., the networks are coherent). The relaxed order network may not support cache coherency (e.g., the network is non-coherent). The relaxed order network also has reduced ordering constraints compared to the CPU network and I/O network. For example, in an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered. In an embodiment, only communications to the same address (at a given granularity, such as a cache block) between the same source and destination agent may be ordered. Because less strict ordering is enforced on the relaxed-order network, higher bandwidth may be achieved on average since transactions may be permitted to complete out of order if younger transactions are ready to complete before older transactions, for example.

The interconnect between the network switches 32, 34, and 36 may have any form and configuration, in various embodiments. For example, in one embodiment, the interconnect may be point-to-point, unidirectional links (e.g., busses or serial links). Packets may be transmitted on the links, where the packet format may include data indicating the virtual channel and subchannel that a packet is travelling in, memory address, source and destination agent identifiers, data (if appropriate), etc. Multiple packets may form a given transaction. A transaction may be a complete communication between a source agent and a target agent. For example, a read transaction may include a read request packet from the source agent to the target agent, one or more coherence message packets among caching agents and the target agent and/or source agent if the transaction is coherent, a data response packet from the target agent to the source agent, and possibly a completion packet from the source agent to the target agent, depending on the protocol. A write transaction may include a write request packet from the source agent to the target agent, one or more coherence message packets as with the read transaction if the transaction is coherent, and possibly a completion packet from the target agent to the source agent. The write data may be included in the write request packet or may be transmitted in a separate write data packet from the source agent to the target agent, in an embodiment.

The arrangement of agents in FIG. 5 may be indicative of the physical arrangement of agents on the semiconductor die forming the SOC 20, in an embodiment. That is, FIG. 5 may be viewed as the surface area of the semiconductor die, and the locations of various components in FIG. 5 may approximate their physical locations with the area. Thus, for example, the I/O clusters 24A-24D may be arranged in the semiconductor die area represented by the top of SOC 20 (as oriented in FIG. 5). The P clusters 22A-22B may be arranged in the area represented by the portion of the SOC 20 below and in between the arrangement of I/O clusters 24A-24D, as oriented in FIG. 5. The GPUs 24A-28D may be centrally located and extend toward the area represented by the bottom of the SOC 20 as oriented in FIG. 5. The memory controllers 26A-26D may be arranged on the areas represented by the right and the left of the SOC 20, as oriented in FIG. 5.

In an embodiment, the SOC 20 may be designed to couple directly to one or more other instances of the SOC 20, coupling a given network on the instances as logically one network on which an agent on one die may communicate logically over the network to an agent on a different die in the same way that the agent communicates within another agent on the same die. While the latency may be different, the communication may be performed in the same fashion. Thus, as illustrated in FIG. 5, the networks extend to the bottom of the SOC 20 as oriented in FIG. 5. Interface circuitry (e.g., serializer/deserializer (SERDES) circuits), not shown in FIG. 5, may be used to communicate across the die boundary to another die. Thus, the networks may be scalable to two or more semiconductor dies. For example, the two or more semiconductor dies may be configured as a single system in which the existence of multiple semiconductor dies is transparent to software executing on the single system. In an embodiment, the delays in a communication from die to die may be minimized, such that a die-to-die communication typically does not incur significant additional latency as compared to an intra-die communication as one aspect of software transparency to the multi-die system. In other embodiments, the networks may be closed networks that communicate only intra-die.

As mentioned above, different networks may have different topologies. In the embodiment of FIG. 5, for example, the CPU and I/O networks implement a ring topology, and the relaxed order may implement a mesh topology. However, other topologies may be used in other embodiments. FIGS. 6, 7, and 8 illustrate portions of the SOC 30 including the different networks: CPU (FIG. 6), I/O (FIG. 7), and relaxed order (FIG. 8). As can be seen in FIGS. 6 and 7, the network switches 32 and 34, respectively, form a ring when coupled to the corresponding switches on another die. If only a single die is used, a connection may be made between the two network switches 32 or 34 at the bottom of the SOC 20 as oriented in FIGS. 6 and 7 (e.g., via an external connection on the pins of the SOC 20). Alternatively, the two network switches 32 or 34 at the bottom may have links between them that may be used in a single die configuration, or the network may operate with a daisy-chain topology.

Similarly, in FIG. 8, the connection of the network switches 36 in a mesh topology between the GPUs 28A-28D and the memory controllers 26A-26D is shown. As previously mentioned, in an embodiment, one or more of the I/O clusters 24A-24D may be coupled to the relaxed order network was well. For example, I/O clusters 24A-24D that include video peripherals (e.g., a display controller, a memory scaler/rotator, video encoder/decoder, etc.) may have access to the relaxed order network for video data.

The network switches 36 near the bottom of the SOC 30 as oriented in FIG. 8 may include connections that may be routed to another instance of the SOC 30, permitting the mesh network to extend over multiple dies as discussed above with respect to the CPU and I/O networks. In a single die configuration, the paths that extend off chip may not be used. FIG. 9 is a block diagram of a two die system in which each network extends across the two SOC dies 20A-20B, forming networks that are logically the same even though they extend over two die. The network switches 32, 34, and 36 have been removed for simplicity in FIG. 9, and the relaxed order network has been simplified to a line, but may be a mesh in one embodiment. The I/O network 44 is shown as a solid line, the CPU network 46 is shown as an alternating long and short dashed line, and the relaxed order network 48 is shown as a dashed line. The ring structure of the networks 44 and 46 is evident in FIG. 9 as well. While two dies are shown in FIG. 9, other embodiments may employ more than two die. The networks may daisy chained together, fully connected with point-to-point links between teach die pair, or any another connection structure in various embodiments.

In an embodiment, the physical separation of the I/O network from the CPU network may help the system provide low latency memory access by the processor clusters 22A-22B, since the I/O traffic may be relegated to the I/O network. The networks use the same memory controllers to access memory, so the memory controllers may be designed to favor the memory traffic from the CPU network over the memory traffic from the I/O network to some degree. The processor clusters 22A-22B may be part of the I/O network as well in order to access device space in the I/O clusters 24A-24D (e.g., with programmed input/output (PIO) transactions). However, memory transactions initiated by the processor clusters 22A-22B may be transmitted over the CPU network. Thus, CPU clusters 22A-22B may be examples of an agent coupled to at least two of the plurality of physically and logically independent networks. The agent may be configured to generate a transaction to be transmitted, and to select one of the at least two of the plurality of physically and logically independent networks on which to transmit the transaction based on a type of the transaction (e.g., memory or PIO).

Various networks may include different numbers of physical channels and/or virtual channels. For example, the I/O network may have multiple request channels and completion channels, while the CPU network may have one request channel and one completion channel (or vice-versa). The requests transmitted on a given request channel when there are more than one may be determined in any desired fashion (e.g., by type of request, by priority of request, to balance bandwidth across the physical channels, etc.). Similarly, the I/O and CPU networks may include a snoop virtual channel to carry snoop requests, but the relaxed order network may not include the snoop virtual channel since it is non-coherent in this embodiment.

FIG. 10 is a block diagram of one embodiment of an input/output (I/O) cluster 24A illustrated in further detail. Other I/O clusters 24B-24D may be similar. In the embodiment of FIG. 10, the I/O cluster 24A includes peripherals 50 and 52, a peripheral interface controller 54, a local interconnect 56, and a bridge 58. The peripheral 52 may be coupled to an external component 60. The peripheral interface controller 54 may be coupled to a peripheral interface 62. The bridge 58 may be coupled to a network switch 34 (or to a network interface that couples to the network switch 34).

The peripherals 50 and 52 may include any set of additional hardware functionality (e.g., beyond CPUs, GPUs, and memory controllers) included in the SOC 20. For example, the peripherals 50 and 52 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include networking peripherals such as media access controllers (MACs). The peripherals may include other types of memory controllers such as non-volatile memory controllers. Some peripherals 52 may include on on-chip component and an off-chip component 60. The peripheral interface controller 54 may include interface controllers for various interfaces 62 external to the SOC 20 including interfaces such as Universal Serial Bus (USB), peripheral component interconnect (PCI) including PCI Express (PCIe), serial and parallel ports, etc.

The local interconnect 56 may be an interconnect on which the various peripherals 50, 52, and 54 communicate. The local interconnect 56 may be different from the system-wide interconnect shown in FIG. 5 (e.g., the CPU, I/O, and relaxed networks). The bridge 58 may be configured to convert communications on the local interconnect to communications on the system wide interconnect and vice-versa. The bridge 58 may be coupled to one of the network switches 34, in an embodiment. The bridge 58 may also manage ordering among the transactions issued from the peripherals 50, 52, and 54. For example, the bridge 58 may use a cache coherency protocol supported on the networks to ensure the ordering of the transactions on behalf of the peripherals 50, 52, and 54, etc. Different peripherals 50, 52, and 54 may have different ordering requirements, and the bridge 58 may be configured to adapt to the different requirements. The bridge 58 may implement various performance-enhancing features as well, in some embodiments. For example, the bridge 58 may prefetch data for a given request. The bridge 58 may capture a coherent copy of a cache block (e.g., in the exclusive state) to which one or more transactions from the peripherals 50, 52, and 54 are directed, to permit the transactions to complete locally and to enforce ordering. The bridge 58 may speculatively capture an exclusive copy of one or more cache blocks targeted by subsequent transactions, and may use the cache block to complete the subsequent transactions if the exclusive state is successfully maintained until the subsequent transactions can be completed (e.g., after satisfying any ordering constraints with earlier transactions). Thus, in an embodiment, multiple requests within a cache block may be serviced from the cached copy. Various details may be found in U.S. Provisional Patent Application Ser. Nos. 63/170,868, filed on Apr. 5, 2021, 63/175,868, filed on Apr. 16, 2021, and 63/175,877, filed on Apr. 16, 2021. These patent applications are incorporated herein by reference in their entireties. To the extent that any of the incorporated material conflicts with the material expressly set forth herein, the material expressly set forth herein controls.

FIG. 11 is a block diagram of one embodiment of a processor cluster 22A. Other embodiments may be similar. In the embodiment of FIG. 10, the processor cluster 22A includes one or more processors 70 coupled to a last level cache (LLC) 72. The LLC 72 may include interface circuitry to interface to the network switches 32 and 34 to transmit transactions on the CPU network and the I/O network, as appropriate.

The processors 70 may include any circuitry and/or microcode configured to execute instructions defined in an instruction set architecture implemented by the processors 70. The processors 70 may have any microarchitectural implementation, performance and power characteristics, etc. For example, processors may be in order execution, out of order execution, superscalar, superpipelined, etc.

The LLC 72 and any caches within the processors 70 may have any capacity and configuration, such as set associative, direct mapped, or fully associative. The cache block size may be any desired size (e.g., 32 bytes, 64 bytes, 128 bytes, etc.). The cache block may be the unit of allocation and deallocation in the LLC 70. Additionally, the cache block may be the unit over which coherency is maintained in this embodiment. The cache block may also be referred to as a cache line in some cases. In an embodiment, a distributed, directory-based coherency scheme may be implemented with a point of coherency at each memory controller 26 in the system, where the point of coherency applies to memory addresses that are mapped to the at memory controller. The directory may track the state of cache blocks that are cached in any coherent agent. The coherency scheme may be scalable to many memory controllers over possibly multiple semiconductor dies. For example, the coherency scheme may employ one or more of the following features: Precise directory for snoop filtering and race resolution at coherent and memory agents; ordering point (access order) determined at memory agent, serialization point migrates amongst coherent agents and memory agent; secondary completion (invalidation acknowledgement) collection at requesting coherent agent, tracked with completion-count provided by memory agent; Fill/snoop and snoop/victim-ack race resolution handled at coherent agent through directory state provided by memory agent; Distinct primary/secondary shared states to assist in race resolution and limiting in flight snoops to same address/target; Absorption of conflicting snoops at coherent agent to avoid deadlock without additional nack/conflict/retry messages or actions; Serialization minimization (one additional message latency per accessor to transfer ownership through a conflict chain); Message minimization (messages directly between relevant agents and no additional messages to handle conflicts/races (e.g., no messages back to memory agent); Store-conditional with no over-invalidation in failure due to race; Exclusive ownership request with intent to modify entire cache-line with minimized data transfer (only in dirty case) and related cache/directory states; Distinct snoop-back and snoop-forward message types to handle both cacheable and non-cacheable flows (e.g. 3 hop and 4 hop protocols). Additional details may be found in U.S. Provisional Patent Application Ser. No. 63/077,371, filed on Sep. 11, 2020. This patent application is incorporated herein by reference in its entirety. To the extent that any of the incorporated material conflicts with the material expressly set forth herein, the material expressly set forth herein controls.

FIG. 12 is a pair of tables 80 and 82 illustrating virtual channels and traffic types and the networks shown in FIGS. 5 to 8 on which they are used for one embodiment. As shown in table 80, the virtual channels may include the bulk virtual channel, the low latency (LLT) virtual channel, the real time (RT virtual channel) and the virtual channel for non-DRAM messages (VCP). The bulk virtual channel may be the default virtual channel for memory accesses. The bulk virtual channel may receive a lower quality of service than the LLT and RT virtual channels, for example. The LLT virtual channel may be used for memory transactions for which low latency is needed for high performance operation. The RT virtual channel may be used for memory transactions that have latency and/or bandwidth requirements for correct operation (e.g., video streams). The VCP channel may be used to separate traffic that is not directed to memory, to prevent interference with memory transactions.

In an embodiment, the bulk and LLT virtual channels may be supported on all three networks (CPU, I/O, and relaxed order). The RT virtual channel may be supported on the I/O network but not the CPU or relaxed order networks. Similarly, the VCP virtual channel may be supported on the I/O network but not the CPU or relaxed order networks. In an embodiment, the VCP virtual channel may be supported on the CPU and relaxed order network only for transactions targeting the network switches on that network (e.g., for configuration) and thus may not be used during normal operation. Thus, as table 80 illustrates, different networks may support different numbers of virtual channels.

Table 82 illustrates various traffic types and which networks carry that traffic type. The traffic types may include coherent memory traffic, non-coherent memory traffic, real time (RT) memory traffic, and VCP (non-memory) traffic. The CPU and I/O networks may be both carry coherent traffic. In an embodiment, coherent memory traffic sourced by the processor clusters 22A-22B may be carried on the CPU network, while the I/O network may carry coherent memory traffic sourced by the I/O clusters 24A-24D. Non-coherent memory traffic may be carried on the relaxed order network, and the RT and VCP traffic may be carried on the I/O network.

FIG. 13 is a flowchart illustrating one embodiment of a method of initiating a transaction on a network. In one embodiment, an agent may generate a transaction to be transmitted (block 90). The transaction is to be transmitted on one of a plurality of physically and logically independent networks. A first network of the plurality of physically and logically independent networks is constructed according to a first topology and a second network of the plurality of physically and logically independent networks is constructed according to a second topology that is different from the first topology. One of the plurality of physically and logically independent networks is selected on which to transmit the transaction based on a type of the transaction (block 92). For example, the processor clusters 22A-22B may transmit coherent memory traffic on the CPU network and PIO traffic on the I/O network. In an embodiment, the agent may select a virtual channel of a plurality of virtual channels supported on the selected network of the plurality of physically and logically independent networks (block 94) based one or more attributes of the transaction other than the type. For example, a CPU may select the LLT virtual channel for a subset of memory transactions (e.g., the oldest memory transactions that are cache misses, or a number of cache misses up to a threshold number, after which the bulk channel may be selected). A GPU may select between the LLT and bulk virtual channels based on the urgency at which the data is needed. Video devices may use the RT virtual channel as needed (e.g., the display controller may issue frame data reads on the RT virtual channel). The VCP virtual channel may be selected for transactions that are not memory transactions. The agent may transmit a transaction packet on the selected network and virtual channel. In an embodiment, transaction packets in different virtual channels may take different paths through the networks. In an embodiment, transaction packets may take different paths based a type of the transaction packet (e.g., request vs. response). In an embodiment, different paths may be supported for both different virtual channels and different types of transactions. Other embodiments may employ one or more additional attributes of transaction packets to determine a path through the network for those packets. Viewed in another way, the network switches form the network may route packets different based on the virtual channel, the type, or any other attributes. A different path may refer to traversing at least one segment between network switches that is not traversed on the other path, even though the transaction packets using the different paths are travelling from a same source to a same destination. Using different paths may provide for load balancing in the networks and/or reduced latency for the transactions.

Computer System

Turning next to FIG. 14, a block diagram of one embodiment of a system 700 is shown. In the illustrated embodiment, the system 700 includes at least one instance of a system on a chip (SOC) 20 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 20 may be included (and more than one memory 702 may be included as well). The memory 702 may include the memories 30A-30D illustrated in FIG. 5, in an embodiment.

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 20 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 14 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 14 are illustrative only and are not intended to be limiting. Other devices are possible and are contemplated.

Computer Readable Storage Medium

Turning now to FIG. 15, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 15 may store a database 804 representative of the SOC 20. Generally, the database 804 may be a database which can be read by a program and used, directly or indirectly, to fabricate the hardware comprising the SOC 20. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 20. The netlist may then be placed and routed to produce a data set describing geometric shapes to be applied to masks. The masks may then be used in various semiconductor fabrication steps to produce a semiconductor circuit or circuits corresponding to the SOC 20. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 20, as desired, including any subset of the components shown in FIG. 5. The database 804 may represent any portion of the above.

In an embodiment, a system comprises a plurality of processor clusters, a plurality of memory controllers, a plurality of graphics processing units, a plurality of agents, and a plurality of network switches coupled to the plurality of processor clusters, the plurality of graphics processing units, the plurality of memory controllers, and the plurality of agents. A given processor cluster comprises one or more processors. The memory controllers are configured to control access to memory devices. A first subset of the plurality of network switches are interconnected to form a central processing unit (CPU) network between the plurality of processor clusters and the plurality of memory controllers. A second subset of the plurality of network switches are interconnected to form an input/output (I/O) network between the plurality of processor clusters, the plurality of agents, and the plurality of memory controllers. A third subset of the plurality of network switches are interconnected to form a relaxed order network between the plurality of graphics processing units, selected ones of the plurality of agents, and the plurality of memory controllers. The CPU network, the I/O network, and the relaxed order network are independent of each other. The CPU network and the I/O network are coherent. The relaxed order network is non-coherent and has reduced ordering constraints compared to the CPU network and I/O network. In an embodiment, at least one of the CPU network, the I/O network, and the relaxed order network has a number of physical channels that differs from a number of physical channels on another one of the CPU network, the I/O network, and the relaxed order network. In an embodiment, the CPU network is a ring network. In an embodiment, the I/O network is a ring network. In an embodiment, the relaxed order network is a mesh network. In an embodiment, a first agent of the plurality of agents comprises an I/O cluster comprising a plurality of peripheral devices. In an embodiment, the I/O cluster further comprises a bridge coupled to the plurality of peripheral devices and further coupled to a first network switch in the second subset. In an embodiment, the system further comprises a network interface circuit configured to convert communications from a given agent to communications for a given network of CPU network, the I/O network, and the relaxed order network, wherein the network interface circuit is coupled to one of the plurality of network switches in the given network.

In an embodiment, a system on a chip (SOC) comprises a semiconductor die on which circuitry is formed. The circuitry comprises a plurality of agents and a plurality of network switches coupled to the plurality of agents. The plurality of network switches are interconnected to form a plurality of physical and logically independent networks. A first network of the plurality of physically and logically independent networks is constructed according to a first topology and a second network of the plurality of physically and logically independent networks is constructed according to a second topology that is different from the first topology. In an embodiment, the first topology is a ring topology. In an embodiment, the second topology is a mesh topology. In an embodiment, coherency is enforced on the first network. In an embodiment, the second network is a relaxed order network. In an embodiment, at least one of the plurality of physically and logically independent networks implements a first number of physical channels and at least one other one of the plurality of physically and logically independent networks implements a second number of physical channels, wherein the first number differs from the second number. In an embodiment, the first network includes one or more first virtual channels and the second network includes one or more second virtual channels. At least one of the one or more first virtual channels differs from the one or more second virtual channels. In an embodiment, the SOC further comprises a network interface circuit configured to convert communications from a given agent of the plurality of agents to communications for a given network of the plurality of physically and logically independent networks. The network interface circuit is coupled to one of the plurality of network switches in the given network. In an embodiment, a first agent of the plurality of agents is coupled to at least two of the plurality of physically and logically independent networks. The first agent is configured to generate a transaction to be transmitted. The first agent is configured to select one of the at least two of the plurality of physically and logically independent networks on which to transmit the transaction based on a type of the transaction. In an embodiment, one of the at least two networks is an I/O network on which I/O transactions are transmitted.

In an embodiment, a method comprises generating a transaction in an agent that is coupled to a plurality of physically and logically independent networks, wherein a first network of the plurality of physically and logically independent networks is constructed according to a first topology and a second network of the plurality of physically and logically independent networks is constructed according to a second topology that is different from the first topology; and selecting one of the plurality of physically and logically independent networks on which to transmit the transaction based on a type of the transaction. In an embodiment, the method further comprises selecting a virtual channel of a plurality of virtual channels supported on the one of the plurality of physically and logically independent networks based one or more attributes of the transaction other than the type.

\* \* \*

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

\* \* \*

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

* * *

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
a plurality of processor clusters, where a given processor cluster comprises one or more processors;
a plurality of graphics processing units;
a plurality of memory controllers configured to control access to memory devices;
a plurality of agents; and
a plurality of network switches coupled to the plurality of processor clusters, the plurality of graphics processing units, the plurality of memory controllers, and the plurality of agents, wherein:
a first subset of the plurality of network switches are interconnected to form a central processing unit (CPU) network between the plurality of processor clusters and the plurality of memory controllers,
a second subset of the plurality of network switches are interconnected to form an input/output (I/O) network between the plurality of processor clusters, the plurality of agents, and the plurality of memory controllers,
a third subset of the plurality of network switches are interconnected to form a relaxed order network between the plurality of graphics processing units, selected ones of the plurality of agents, and the plurality of memory controllers,
the CPU network, the I/O network, and the relaxed order network are independent of each other,
the CPU network and the I/O network are coherent, and
the relaxed order network is non-coherent and has reduced ordering constraints compared to the CPU network and I/O network.

2. The system as recited in claim 1 wherein at least one of the CPU network, the I/O network, and the relaxed order network has a number of physical channels that differs from a number of physical channels on another one of the CPU network, the I/O network, and the relaxed order network.

3. The system as recited in claim 1 wherein the CPU network is a ring network.

4. The system as recited in claim 1 wherein the I/O network is a ring network.

5. The system as recited in claim 1 wherein the relaxed order network is a mesh network.

6. The system as recited in claim 1 wherein a first agent of the plurality of agents comprises an I/O cluster comprising a plurality of peripheral devices.

7. The system as recited in claim 6 wherein the I/O cluster further comprises a bridge coupled to the plurality of peripheral devices and further coupled to a first network switch in the second subset.

8. The system as recited in claim 1 further comprising a network interface circuit configured to convert communications from a given agent to communications for a given network of CPU network, the I/O network, and the relaxed order network, wherein the network interface circuit is coupled to one of the plurality of network switches in the given network.

9. A system on a chip (SOC) comprising a semiconductor die on which circuitry is formed, wherein the circuitry comprises:
a plurality of processor clusters, where a given processor cluster comprises one or more processors;
a plurality of graphics processing units;

a plurality of memory controllers configured to control access to memory devices;
a plurality of input/output (I/O) clusters, wherein a given I/O cluster comprises one or more peripheral devices; and
a plurality of network switches coupled to the plurality of processor clusters, the plurality of graphics processing units, the plurality of memory controllers, and the plurality of I/O clusters, wherein:
a first subset of the plurality of network switches are interconnected to form a central processing unit (CPU) network between the plurality of processor clusters and the plurality of memory controllers,
a second subset of the plurality of network switches are interconnected to form an I/O network between the plurality of processor clusters, the plurality of I/O clusters, and the plurality of memory controllers,
a third subset of the plurality of network switches are interconnected to form a relaxed order network between the plurality of graphics processing units, selected ones of the plurality of I/O clusters, and the plurality of memory controllers,
the CPU network, the I/O network, and the relaxed order network are independent of each other,
the CPU network and the I/O network are coherent, and the relaxed order network is non-coherent and has reduced ordering constraints compared to the CPU network and I/O network.

10. The SOC as recited in claim 9 wherein at least one of the CPU network, the I/O network, and the relaxed order network has a number of physical channels that differs from a number of physical channels on another one of the CPU network, the I/O network, and the relaxed order network.

11. The SOC as recited in claim 9 wherein the CPU network is a ring network.

12. The SOC as recited in claim 9 wherein the I/O network is a ring network.

13. The SOC as recited in claim 9 wherein the relaxed order network is a mesh network.

14. The SOC as recited in claim 9 wherein the given I/O cluster further comprises a bridge coupled to the one or more peripheral devices and further coupled to a first network switch in the second subset.

15. The SOC as recited in claim 9 further comprising a network interface circuit configured to convert communications from a given agent to communications for a given network of CPU network, the I/O network, and the relaxed order network, wherein the network interface circuit is coupled to one of the plurality of network switches in the given network.

16. The SOC as recited in claim 9 wherein:
the CPU network includes one or more first virtual channels and the I/O network includes one or more second virtual channels; and
at least one of the one or more second virtual channels differs from the one or more first virtual channels.

17. The SOC as recited in claim 9 wherein a first processor cluster of the plurality of processor clusters is configured to generate a transaction to be transmitted, and wherein the first processor cluster is configured to select one of CPU network or the I/O network on which to transmit the transaction based on a type of the transaction.

18. The SOC as recited in claim 9 wherein:
the relaxed order network includes a plurality of virtual channels; and
transactions in different virtual channels of the plurality of virtual channels take different paths through the relaxed order network from a given source to a given target.

19. The SOC as recited in claim 9 wherein:
the relaxed order network is configured to route transactions from a given source to a given target, and wherein different paths through the relaxed order network from the given source to the given target are selected for the transactions based on one or more attributes of the transactions.

20. A method comprising:
generating a transaction in one of a plurality of processor clusters in a system, where a given processor cluster comprises one or more processors, and wherein the system further comprises:
a plurality of graphics processing units;
a plurality of memory controllers configured to control access to memory devices;
a plurality of agents; and
a plurality of network switches coupled to the plurality of processor clusters, the plurality of graphics processing units, the plurality of memory controllers, and the plurality of agents, wherein:
a first subset of the plurality of network switches are interconnected to form a central processing unit (CPU) network between the plurality of processor clusters and the plurality of memory controllers,
a second subset of the plurality of network switches are interconnected to form an input/output (I/O) network between the plurality of processor clusters, the plurality of agents, and the plurality of memory controllers,
a third subset of the plurality of network switches are interconnected to form a relaxed order network between the plurality of graphics processing units, selected ones of the plurality of agents, and the plurality of memory controllers,
the CPU network, the I/O network, and the relaxed order network are independent of each other,
the CPU network and the I/O network are coherent, and the relaxed order network is non-coherent and has reduced ordering constraints compared to the CPU network and I/O network; and
transmitting the transaction on one of the I/O network and the CPU networking depending on a type of the transaction.

21. The method as recited in claim 20 further comprising:
generating a second transaction by a given graphics processing unit of the plurality of graphics processing units; and
transmitting the second transaction on the relaxed order network, wherein a route through the relaxed order network of the second transaction is based on one or more attributes of the second transaction.

22. The method as recited in claim 20 further comprising:
generating a second transaction by a given graphics processing unit of the plurality of graphics processing units; and
transmitting the second transaction on the relaxed order network, wherein a route through the relaxed order network of the second transaction is based on which of a plurality of virtual channels the second transaction is transmitted.

* * * * *